Figure 1:
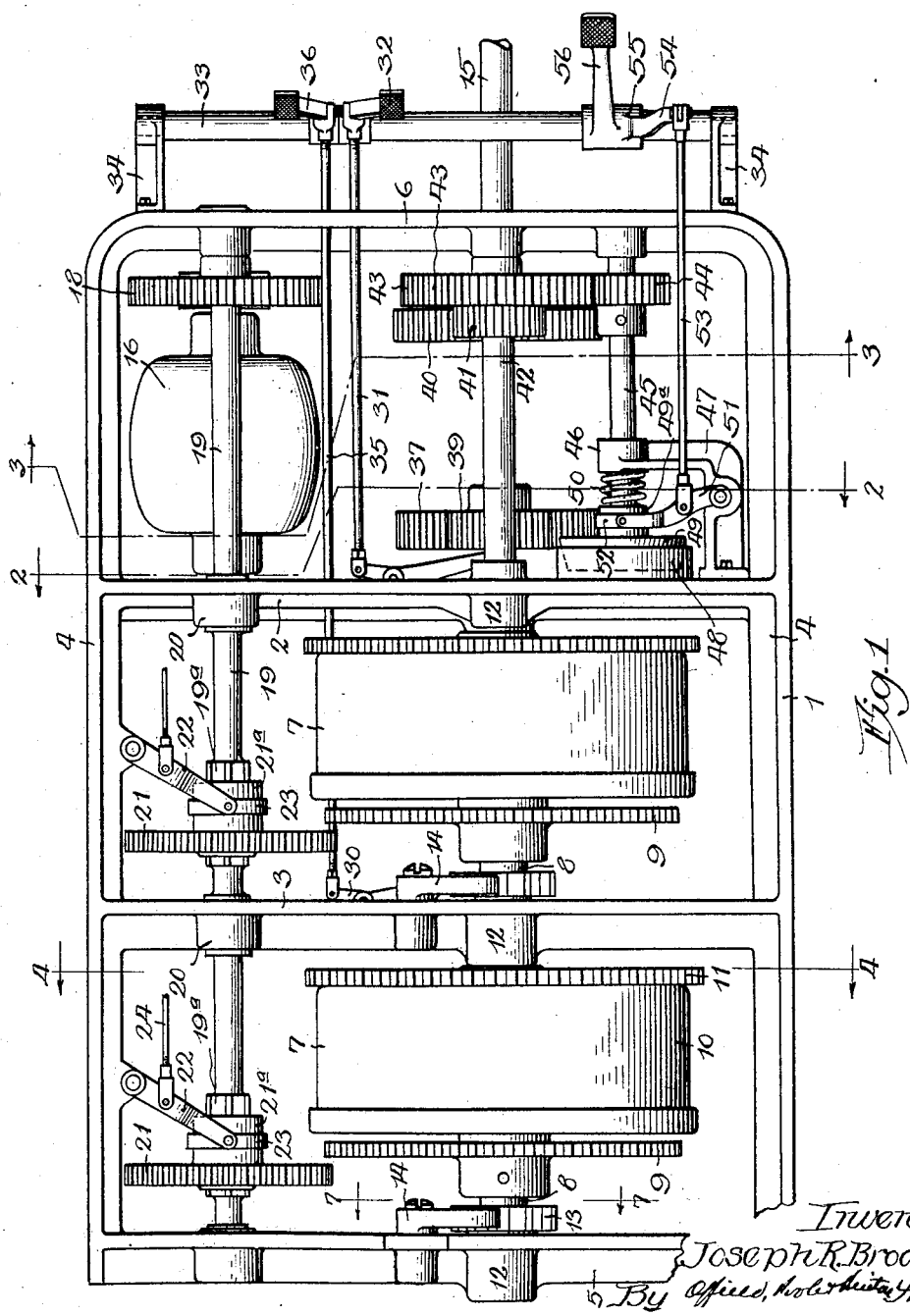

J. R. BROACH.
PROPELLING MECHANISM FOR VEHICLES.
APPLICATION FILED MAR. 7, 1921.

1,389,735.

Patented Sept. 6, 1921.
3 SHEETS—SHEET 1.

Inventor,
Joseph R. Broach,

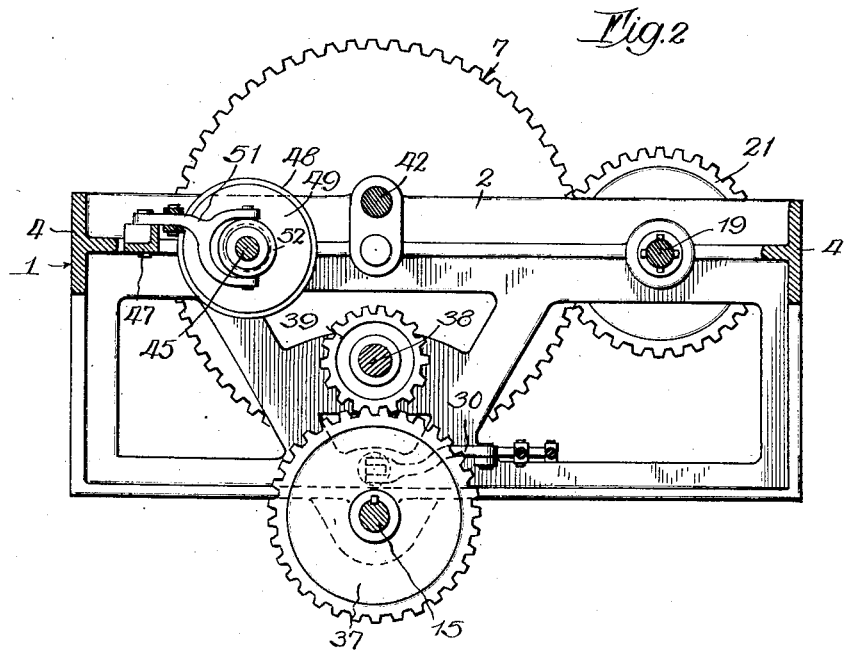
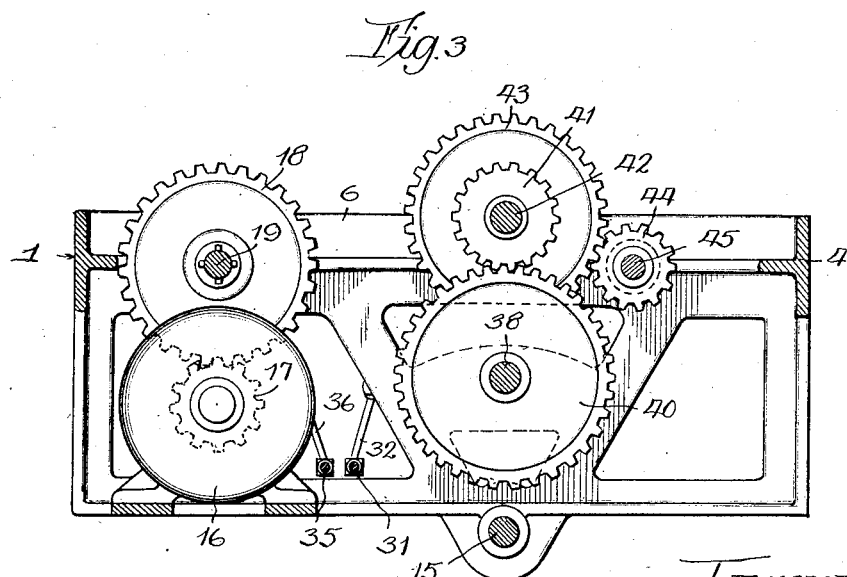

J. R. BROACH.
PROPELLING MECHANISM FOR VEHICLES.
APPLICATION FILED MAR. 7, 1921.
1,389,735.
Patented Sept. 6, 1921.
3 SHEETS—SHEET 3.
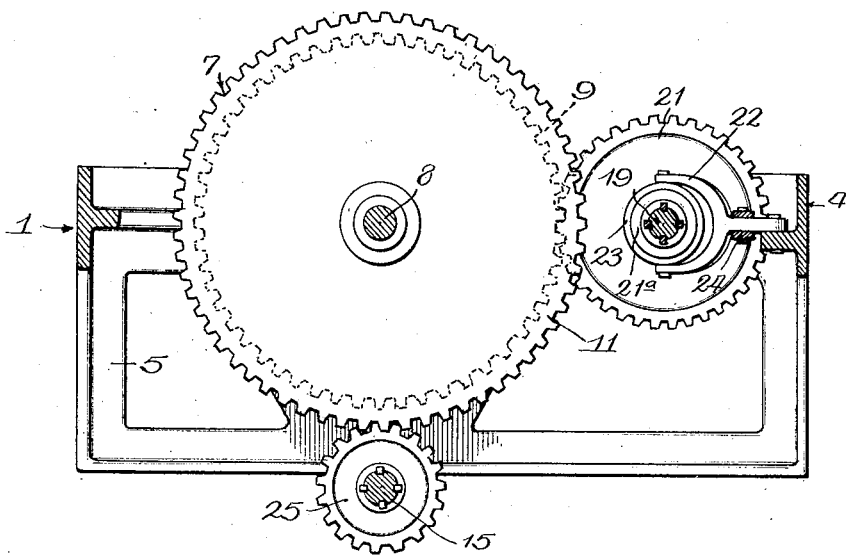
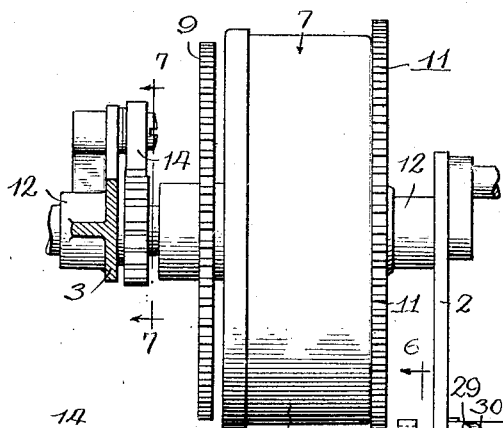
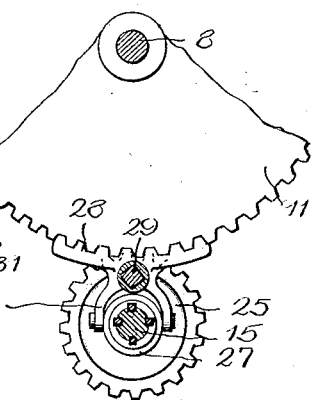
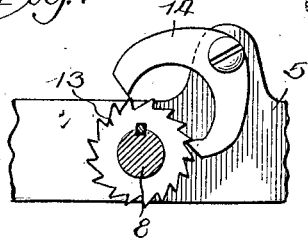
Inventor,
Joseph R. Broach,

UNITED STATES PATENT OFFICE.

JOSEPH R. BROACH, OF CHICAGO, ILLINOIS.

PROPELLING MECHANISM FOR VEHICLES.

1,389,735.	Specification of Letters Patent.	Patented Sept. 6, 1921.

Application filed March 7, 1921. Serial No. 450,269.

*To all whom it may concern:*

Be it known that I, JOSEPH R. BROACH, a citizen of the United States, and a resident of Chicago, in the county of Cook and State of Illinois, have invented certain new and useful Improvements in Propelling Mechanism for Vehicles, of which the following is a specification.

This invention relates to improvements in propelling mechanism for vehicles, and more particularly to the adaptation of spring actuated driving units or motors as the source of power, together with mechanism for transmitting the power to the point of application, whether it be the drive shaft of a wheeled vehicle, or one of several driven members that might be driven thereby.

In adapting the spring actuated motor to any of many uses that might be suggested, it is proposed to employ two or more separate motor units, each capable of being connected separately with a drive shaft, in order to permit the restoration of power in one motor while the other is in operation, and vice versa. As a necessary adjunct to this arrangement, mechanism is employed for winding each motor, there being preferably used for this purpose an electric motor and a source of electric current such as a storage battery.

The preferred embodiment of the invention is disclosed as the power plant of a vehicle, although the mechanical arrangement may be equally adapted for stationary purposes, or, if desired, as the driving mechanism of wheel vehicles for children.

The construction of the propelling mechanism is hereinafter fully described and illustrated in the accompanying drawings, in which—

Figure 1 is a top plan view of a mechanism as mounted in a suitable supporting or vehicle frame, Fig. 2 is a view in vertical section taken on line 2—2 of Fig. 1, Fig. 3 is a similar view taken on line 3—3 of Fig. 1, Fig. 4 is a similar view taken on line 4—4 of Fig. 1, Fig. 5 is a detailed view in side elevation of one of the driving units, and the shifting mechanism associated therewith, Fig. 6 is a detailed view in vertical section taken on line 6—6 of Fig. 5, and Fig. 7 is a detailed view in vertical section taken on line 7—7 of Fig. 5, and showing the pawl and ratchet mechanism associated with each driving unit.

The supporting frame 1 is of any suitable form, though preferably consisting of a rectangular frame which is divided longitudinally into three sections or compartments of substantially equal size, by the provision of transverse frame members or transoms 2 and 3 extending between the longitudinal frame members 4—4 and parallel with the front and rear transverse frame members 5 and 6 respectively.

Considering the left of Fig. 1 as the front of the frame 1, there is mounted in the forward compartment or section, and the one immediately to the rear thereof, spring motors 7—7, each of these motors being of the common construction comprising a helical spring not shown, which is wound about the rotative shaft 8 and secured at one end thereto, said shaft having a gear wheel 9 fixed thereto. The opposite end of the helical spring is secured to a drum 10, to which is fixed a gear wheel 11. The shaft 8, which also serves as a supporting member for the motor 7, is journaled at its ends in bearings 12—12 formed in the transverse frame members on either side of the spring motor. At one end of each of the shafts is provided a pawl and ratchet mechanism consisting of a ratchet wheel 13 fixed to the shaft 8, a pawl 14 pivotally mounted upon the transverse frame member 5, in the manner clearly shown in Fig. 7. The function of the pawl and ratchet mechanism is to permit the shaft to be rotated in one direction; namely, in a counter-clockwise direction, but to prevent it from being rotated in the opposite direction under the tension of the spring. Thus, if the gear wheel 9 fixed to the shaft 8 is rotated in a counter-clockwise direction, the helical spring attached at one end thereto and inclosed within the drum will be wound up; that is to say, placed under tension. Moreover, the power thus stored in the spring by the rotation of the gear wheel 9 will be delivered by the rotation of the drum 10 and gear wheel 11, the latter being operatively connected with a drive shaft 15 by gearing hereinafter to be described in detail.

The description immediately preceding applies to the driving unit located in either compartment of the frame, it being pointed out at this time that the two units are identical in every respect.

As a means for delivering power to the driving units, and by that is meant the winding of the springs thereof, the following mechanism is employed. At one end of the frame, and preferably near the rear end thereof, is mounted an electric motor 16 adapted to be operated from a source of electrical energy such as a storage battery carried by the vehicle, although this element is not shown, nor is the switch by which the circuit, including the motor and the battery, may be opened or closed. On the armature shaft of the motor 16 is a gear pinion 17 which meshes with a gear wheel 18 fixed to a shaft 19 extending longitudinally throughout the length of the frame, and journaled in suitable bearings 20 in the several transverse frame members. Slidably mounted on the shaft 19 are two gear wheels 21—21, each being identical in construction, operation and function, one being associated with each of the driving units. These sliding gear wheels 21—21 are adapted to be shifted into and out of mesh with the gear wheels 9—9 of their respective driving units 7—7, and as a means for shifting said gear wheels, a suitable form of yoke member 22 is pivotally mounted upon the adjacent longitudinal frame member 4, said yoke straddling the hub 21ª of the gear wheel, and connected thereto by means of a loose collar 23 surrounding said hub. Attached to each of the yoke members 22 is a shift rod 24 which extends rearwardly to a point within access of the operator, and there provided with a suitable shifting lever (not shown), thus permitting either or both of the gear wheels to be shifted into engagement with the gear wheels 9—9 of the driving units. As a preferable arrangement, the shaft 19 is provided with splined portions 19ª—19ª on which the gear wheels 21—21 are mounted, thus permitting the same to be shifted without rotating upon the shaft.

Referring now to the manner in which the power is delivered from each driving unit, and bearing in mind that the two driving units are identical, Figs. 4 and 5 clearly show the location of the power or driving shaft 15 with respect to the motor 7; namely, immediately below and extending parallel to the axis of said motor. Associated with each of the motors, and slidably mounted on the power shaft 15 is a gear wheel 25 adapted to be moved into and out of mesh with the driven gear wheel 11 of the respective motor 7. The gear wheel 25 is mounted on its shaft 15 by means of splines 15ª, thereby providing the usual non-rotative connection therewith, and as clearly shown in Fig. 5, the gear wheel is adapted to slide to the left to be disconnected from the gear wheel 11, and in the opposite direction to be thrown into mesh therewith. Inasmuch as the driven gear wheel 11 and the spring of the motor 7 are directly connected, without an intermediate clutch or other device for restraining the gear wheel 11 from rotation, means are provided for holding or locking the gear wheel 11 from rotation when the drive shaft is disconnected therefrom. The means used for this purpose is preferably made a part of the gear shifting mechanism now to be described. Referring to Figs. 5 and 6, it will be seen that the gear wheel 25 is provided with an extended hub 25ª, about which is mounted a loose collar 26. Pivotally connected to the collar, and straddling the same is a yoke member 27. Integral with the yoke member is a tooth sector 28, conforming in pitch to that of the gear wheel 11, and located in horizontal alinement therewith, and furthermore offset from the gear wheel 25 a slight distance to the right (Fig. 5) so that when the gear wheel 25 is moved out of mesh with the gear wheel 11, the sector 28 will be simultaneously moved into mesh therewith and vice versa. The integrally connected yoke 27 and sector 28 are mounted on a sliding rod 29, supported in the adjacent transverse frame member 2, said rod being preferably squared throughout the portion engaged by the yoke and sector in order to counteract the tendency of the sector to be rotated about the rod, by the power applied thereto through the driven gear 11. Connected to the outer end of the sliding rod 29 is a lever 30 pivotally mounted on the lower part of the transverse frame member 2, and extending in a lateral direction from the axis of the power shaft 15. The arrangement of this lever 30 is clearly shown in Fig. 2. Connected with the opposite end of the lever 30 is a rod 31 extending rearwardly beyond the rear frame member 6 of the supporting frame, and there connected with an operating lever 32, which may be either a foot pedal or hand lever, as desired. As a support for the operating lever 32, as well as other operating levers hereinafter to be described, a fixed transverse shaft 33 is mounted upon the frame 1 by means of rearwardly extending brackets 34—34 supporting the ends of said shaft 33. Thus it will be seen that by throwing the operating lever 32 in a rearward direction, the sliding gear wheel 25 is thrown forwardly out of mesh with the gear 11, and the sector 29 simultaneously thrown into mesh with the gear wheel 11, thus locking said gear wheel 11 from rotation under the power transmitted thereto from the motor.

The same mechanism is employed in connection with the other driving unit; namely, the motor 7 located in the forward compartment of the supporting frame. In this instance, the same mechanism is repeated, including a separate operating rod 35 extending parallel with the previously described rod 31, and provided with a similar, yet separate, operating lever 36 mounted upon the fixed shaft 33. In this manner, each driving unit may be operated separately and independent of each other, so that either or both may be connected with the drive shaft 15 with the result that the vehicle may be driven from one motor only, during which period the other motor may be undergoing a restoration of power through the medium of the winding mechanism already described, or, assuming that full power is required to drive the vehicle, both driving units may be connected to the power shaft at the same time.

As is common in power transmission devices, a clutch mechanism is employed for the purpose of disconnecting the driving units or source of power from the driven mechanism in order to change speed, or for any other purposes requiring momentary interruption in the transmission of power. As a preferable arrangement of clutch mechanism, the following may be employed. In the rearmost compartment of the frame 1, and immediately adjacent to the motor 16 is mounted a gear train and clutch device which may be described as follows: Mounted upon the drive shaft 15, and immediately to the rear of the transverse frame member 2 is a gear wheel 37, constituting the primary member of the gear train (Figs. 1 and 2). Immediately above the drive shaft 15 is a shaft 38 journaled at its ends in bearings formed in the transverse frame members 2 and 6. Keyed to this shaft is a pinion 39 meshing with the gear wheel 37 on the drive shaft 15. At the opposite end of the drive shaft 38 is keyed a gear wheel 40 (Fig. 3) which in turn meshes with a pinion 41 mounted upon a shaft 42 immediately above the shaft 38 and similarly journaled in the frame members 2 and 6. Immediately adjacent to the pinion 41, and likewise keyed to the shaft 42 is a larger gear wheel 43 which meshes with a pinion 44 fixed to a parallel shaft 45 offset laterally therefrom, and to the right and slightly below the same, as clearly shown in Figs. 1 and 3. This shaft is journaled at its rear end in the transverse frame member 6, and at a point spaced inwardly from its forward end by means of a bearing 46 mounted at the end of an L-shaped bracket 47 secured to the transverse frame member 2. Mounted upon the forward end portion of the shaft 45 is a clutch mechanism comprising a stationary clutch member 48 of the cone type mounted upon the transverse frame 2, and a rotative companion clutch member 49 fixed to the shaft 45. The clutch member 49 is slidable endwise upon the shaft 45, and normally held in clutch engaging position by means of a coil spring 50 located between the hub 49$^a$ and the shaft bearing 46. As a means for withdrawing the shiftable clutch member 49 from clutch engaging position, a yoke member 51 is pivotally mounted upon the L-shaped arm 47 and straddles the hub 49$^a$ of the clutch member 49, and is connected thereto through the medium of a loose collar 52. A shift rod 53 is connected at one end to the yoke member 51 intermediate the ends thereof, and extends rearwardly beyond the frame member 6, where it is connected to an arm 54, forming a part of a rotative operating member 55, comprising a sleeve journaled on the fixed shaft 33, and a foot operating lever 56.

It is to be observed that the gear train is directly connected with the drive shaft, and is driven thereby, the gear train being so arranged that the speed of the clutch member 49 is greatly reduced. Conversely, the power or clutching action transmitted from the clutch to the power shaft is proportionately increased so that through the medium of the clutch mechanism and gear train, the delivery of power can be readily controlled. Thus, when the clutch is in clutching position, the drive shaft is held from rotation, thus effectually preventing the delivery of power to the drive wheels. Similarly by slowly releasing the clutch members, the power is gradually delivered to the drive wheels and the vehicle will gradually be moved forwardly at accelerated speed.

Although I have described a specific embodiment of the invention, it is to be understood that the same may be variously modified without departing from the spirit of the invention, and for this reason, I do not wish to be limited except in so far as the invention is pointed out in the appended claims:

1. A propelling mechanism comprising a plurality of spring actuated motors, each including a driven gear wheel, means for winding said motors, a drive shaft, gear wheels slidably mounted on said shaft, shifting mechanism for said sliding gear wheels, and means for locking the driven gear wheel of each motor when its associated gear wheel is shifted out of engagement therewith.

2. A propelling mechanism comprising a plurality of spring actuated motors, each including a driven gear wheel, means for winding said motors, a drive shaft, sliding gear wheels mounted on said shaft, and adapted to be shifted into and out of driving engagement with the driven gear wheels of said motors, shifting mechanism for each gear wheel, comprising means for locking the associated driven gear wheel from rotation when the sliding gear wheel is shifted out of engagement therewith.

3. A propelling mechanism comprising a pair of spring actuated motors arranged in axial alinement, and including associated driven gear wheels, means for winding said motors a drive shaft provided with sliding gear wheels adapted to be shifted into and out of driving engagement with driven gear wheels, shifting mechanism for each sliding gear wheel, comprising a shiftable locking member adapted to engage said driven gear wheels when the associated sliding gear wheels are shifted out of engagement therewith.

4. A propelling mechanism comprising a pair of spring actuated motors arranged in axial alinement, and including associated driven gear wheels, means for winding said motors, a drive shaft provided with sliding gear wheels adapted to be shifted into and out of driving engagement with driven gear wheels, shifting mechanism for each sliding gear wheel, comprising toothed sectors slidable with said sliding gear wheels, and adapted to engage said driven gear wheels when the associated gear wheels are shifted out of engagement therewith.

5. A propelling mechanism comprising a plurality of spring actuated motors provided with driven gear wheels, means for winding said motors, a drive shaft having gear wheels slidably mounted thereon, adapted to be shifted into and out of engagement with said driven gear wheels, shifting mechanism operatively connected with each of said sliding gear wheels, means operated by said shifting mechanism for locking said driven gear wheels from rotation when the same are out of engagement with their respective sliding gear wheels, and clutch mechanism operatively connected with said drive shaft.

6. A propelling mechanism for vehicles, comprising a plurality of spring actuated motors provided with driven gear wheels, means for winding said motors, a drive shaft having gear wheels slidably mounted thereon adapted to be shifted into and out of engagement with said driven gear wheels, shifting mechanism operatively connected with each of said sliding gear wheels, and comprising a non-rotative toothed sector offset axially from each sliding gear wheel, and movable therewith into engagement with said driven gear wheel when said sliding gear wheels are shifted out of engagement therewith, and vice versa.

7. A propelling mechanism for vehicles, comprising a plurality of spring actuated motors provided with driven gear wheels, means for winding said motors, a drive shaft having gear wheels slidably mounted thereon, adapted to be shifted into and out of engagement with said driven gear wheels, shifting mechanism operatively connected with each of said sliding gear wheels, a gear train operatively connected with said drive shaft, and a normally operated friction device acting on said shaft through said gear train.

In witness whereof, I hereunto subscribe my name this 3rd day of March, A. D., 1921.

JOSEPH R. BROACH.